(12) United States Patent
Cherlin

(10) Patent No.: US 11,409,009 B2
(45) Date of Patent: Aug. 9, 2022

(54) SEMICONDUCTOR DETECTOR GEOMETRY

(71) Applicant: KROMEK LIMITED

(72) Inventor: Alexander Cherlin, Sedgefield (GB)

(73) Assignee: KROMEK LIMITED, Sedgefield (GB)

( * ) Notice: Subject to any disclaimer, the term of this patent is extended or adjusted under 35 U.S.C. 154(b) by 165 days.

(21) Appl. No.: 16/628,591

(22) PCT Filed: Jul. 2, 2018

(86) PCT No.: PCT/GB2018/051850
§ 371 (c)(1),
(2) Date: Jan. 3, 2020

(87) PCT Pub. No.: WO2019/008333
PCT Pub. Date: Jan. 10, 2019

(65) Prior Publication Data
US 2020/0191981 A1 Jun. 18, 2020

(30) Foreign Application Priority Data
Jul. 3, 2017 (GB) ...................................... 1710642

(51) Int. Cl.
*G01T 1/29* (2006.01)
(52) U.S. Cl.
CPC .................................. *G01T 1/2928* (2013.01)
(58) Field of Classification Search
CPC ..................................................... G01T 1/2928
See application file for complete search history.

(56) References Cited

U.S. PATENT DOCUMENTS

| | | | | |
|---|---|---|---|---|
| 5,825,033 A | * | 10/1998 | Barrett | H01L 27/14658 250/370.1 |
| 8,120,683 B1 | * | 2/2012 | Turner | H04N 5/32 348/295 |
| 2013/0099127 A1 | * | 4/2013 | Atzinger | G01T 1/2928 250/371 |

FOREIGN PATENT DOCUMENTS

DE 102011085080 A1 4/2013

OTHER PUBLICATIONS

M. Esposito et al., "C autoradiography with an energy-sensitive silicon pixel detector", Physics in Medicine and Biology, Mar. 2, 2011, 19 pages, vol. 56, No. 7, IOP Publishing.

(Continued)

*Primary Examiner* — Hugh Maupin
(74) *Attorney, Agent, or Firm* — Ference & Associates LLC

(57) ABSTRACT

A method of fabricating a semiconductor detector device to exhibit a target sensitivity to incident radiation in a predetermined energy range is described, the method comprising: providing a semiconductor detector; defining on a detector surface of the semiconductor detector a large plurality of pixels; wherein the detector is geometry is controlled with reference to the size of the said pixels such that a single interaction event in the predetermined energy range will produce a detectable signal in each of a plurality of adjacent pixels making up a cluster of at least three pixels. A detector fabricated by such a method and a method of obtaining spectral information about incident radiation using such a detector are also described.

20 Claims, 7 Drawing Sheets

(56) References Cited

OTHER PUBLICATIONS

Figure 1:
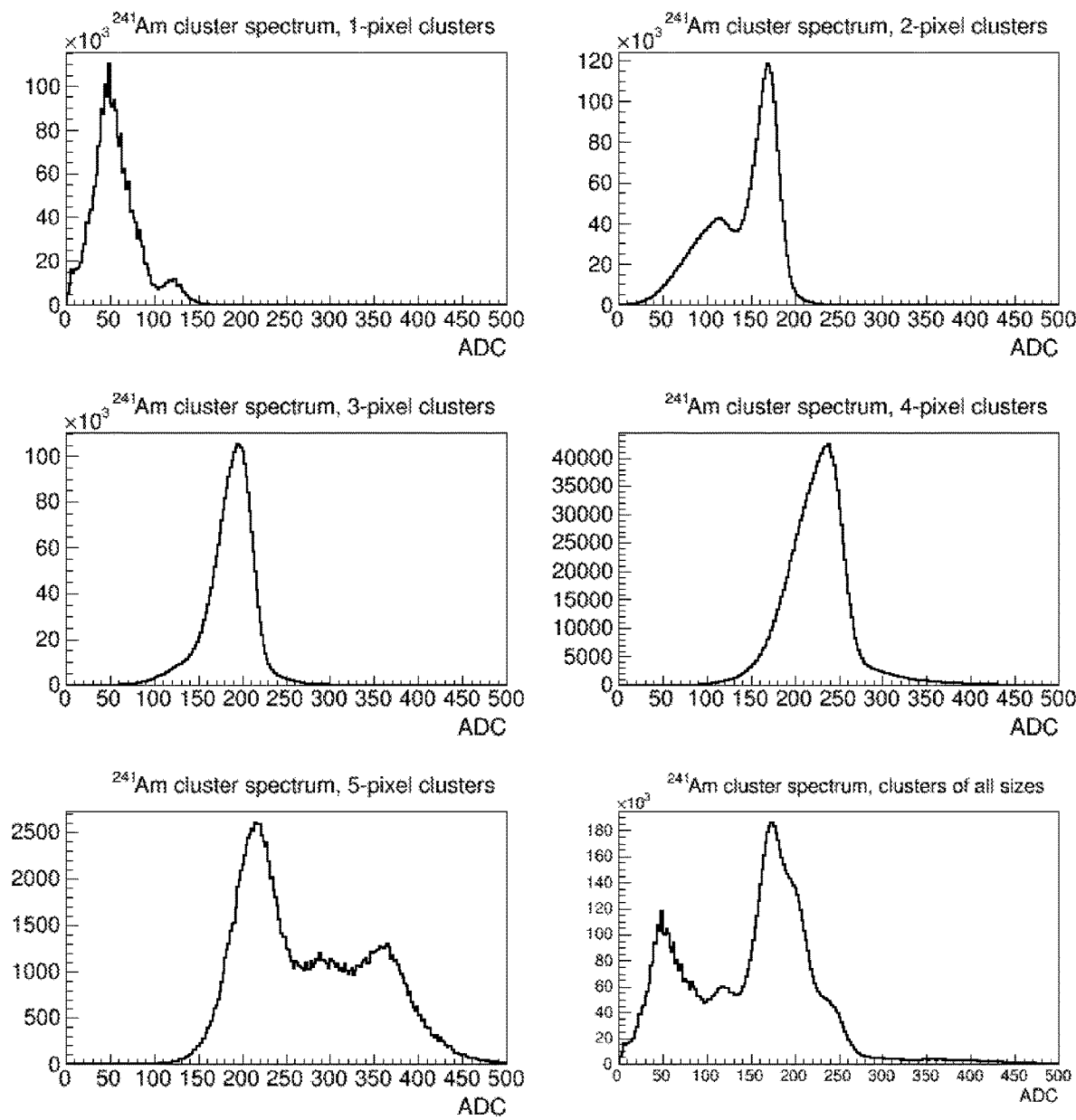
Figure 2A:
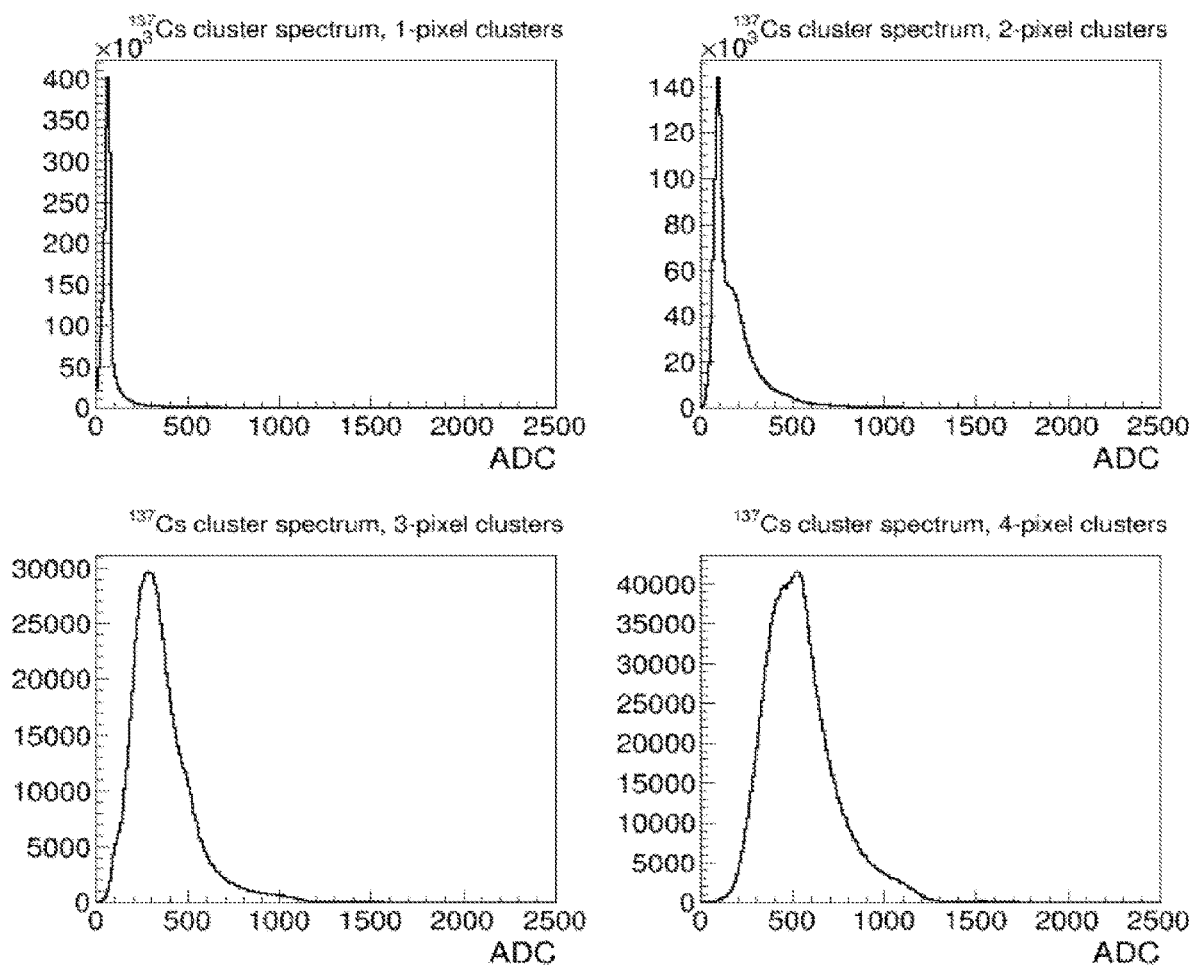
Figure 2B:
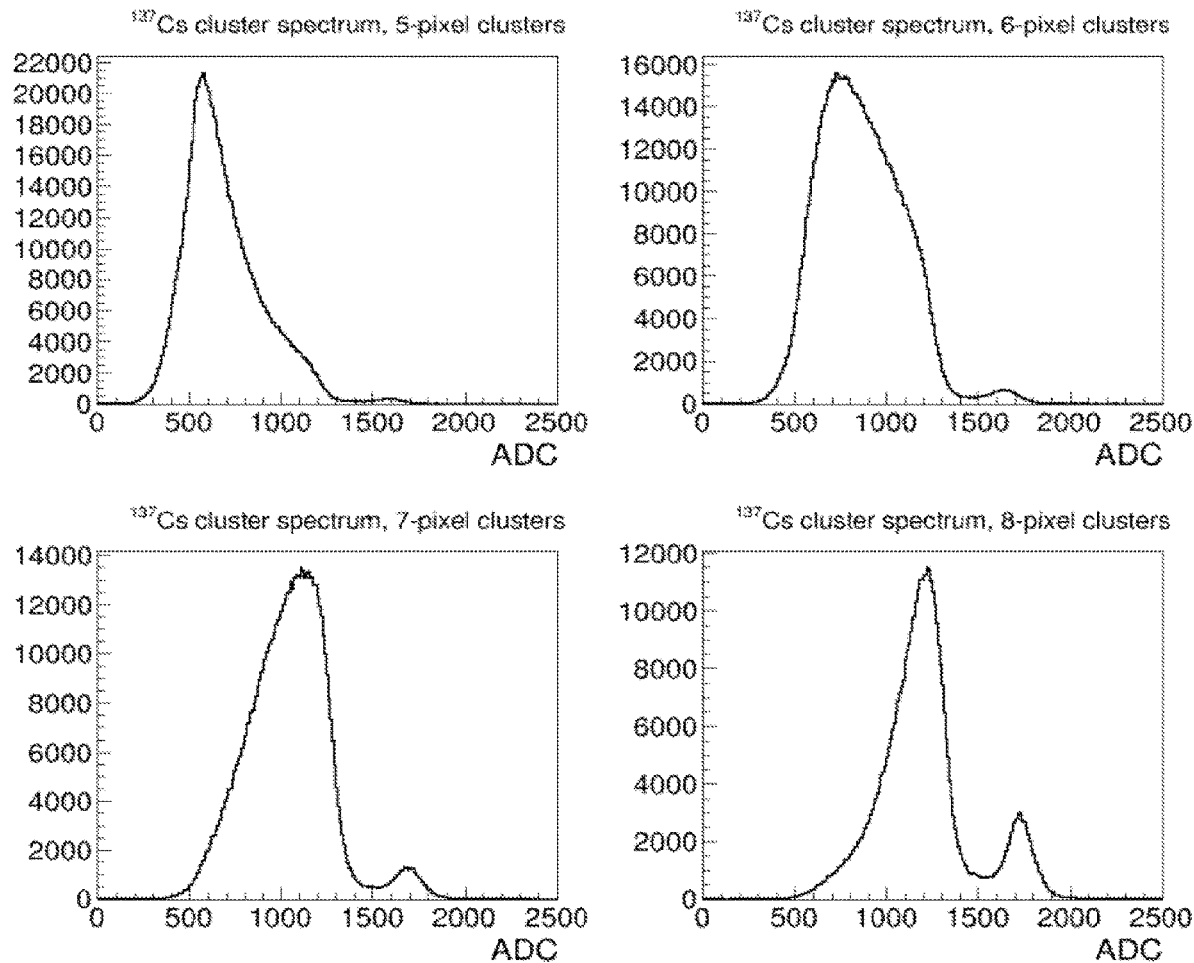
Figure 2C:
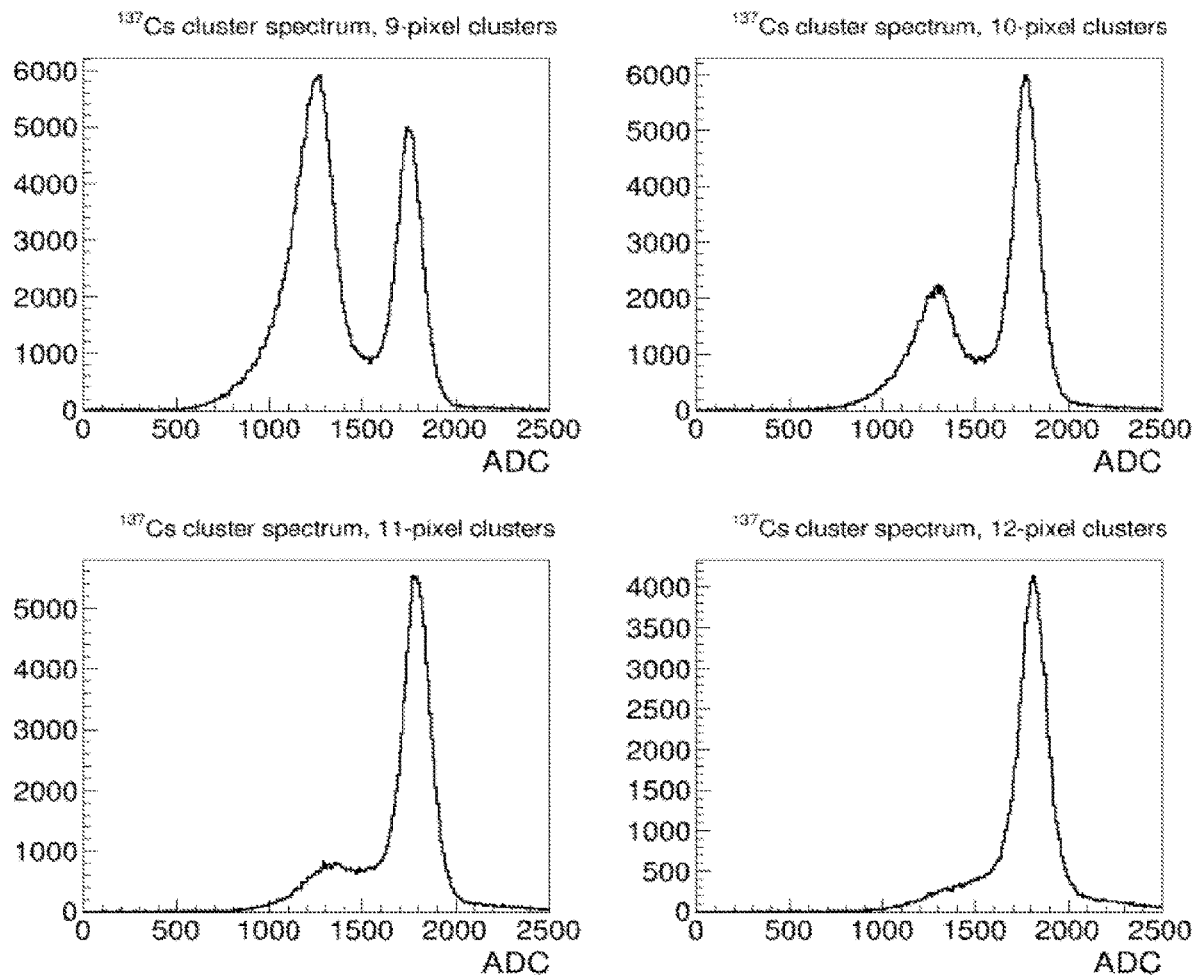
Figure 2D:
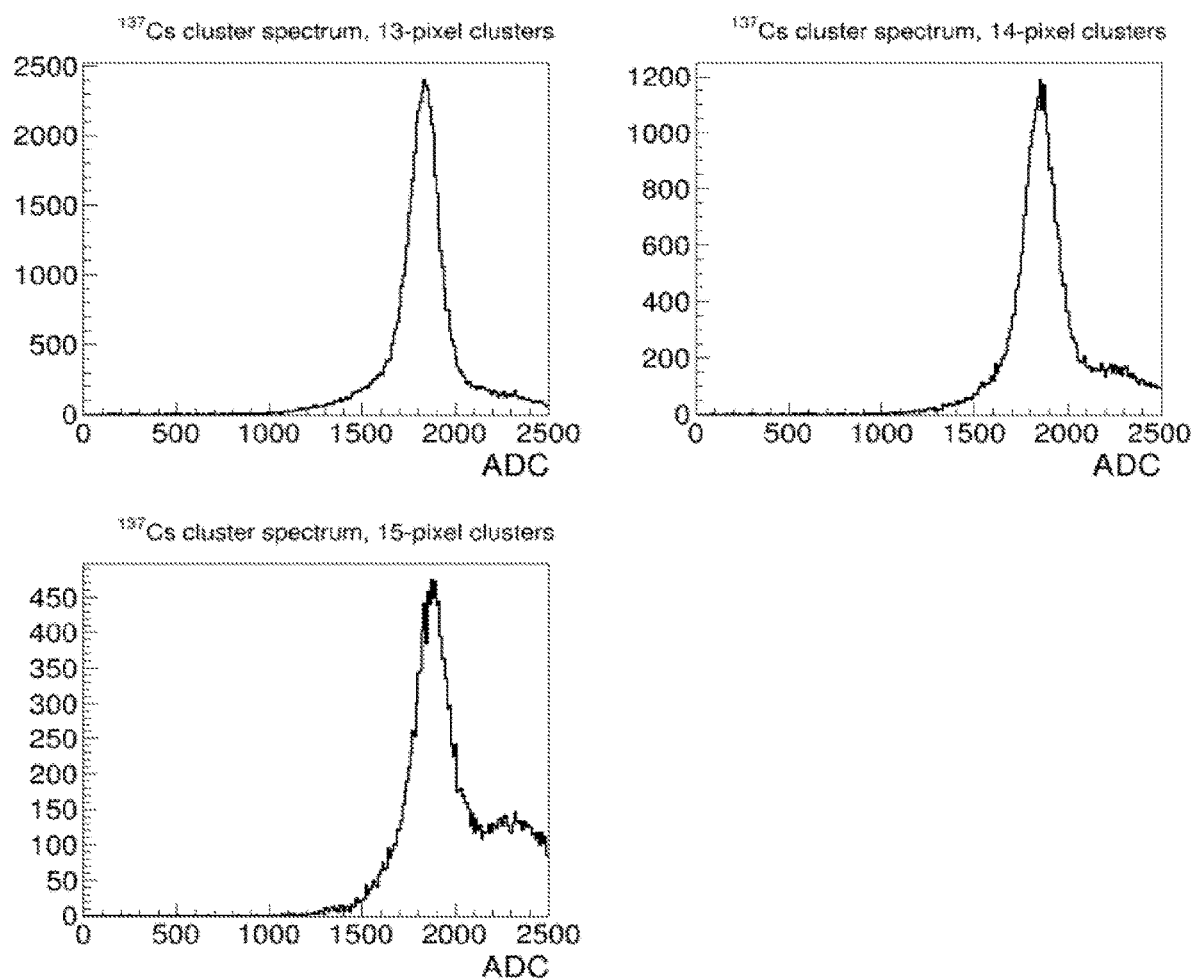

M. Campbell et al., "Study of the charge sharing in a silicon pixel detector by means of α-particles interacting with a Medipix2 device", Nuclear Instruments & Methods in Physics Research, Jun. 11, 2008, 4 pages, vol. 591, No. 1, Elsevier, ScienceDirect.
L. Gabellieri et al., "X-ray Imaging in Tokamaks: Characterization of a C-Mos Imager (Medipix-2)", 40th EPS Conference on Plasma Physics, Jan. 1, 2013, 1 page.
ISA/EP, European Patent Office, International Search Report and Written Opinion, dated Sep. 5, 2018, 13 pages, European Patent Office.

* cited by examiner

SEMICONDUCTOR DETECTOR GEOMETRY

The present application is a National Phase Entry of PCT International Application No. PCT/GB2018/051850, which was filed on Jul. 2, 2018, and which claims priority to Application No. 1710642.8 filed in Great Britain on Jul. 3, 2017, the contents of which are hereby incorporated by reference.

The invention relates to methods of preparing semiconductor detectors with detector geometries that are controlled to deliver particular device properties, to semiconductor detectors with such controlled geometries, and to methods of obtaining spectral information about incident radiation using such detectors. The invention relates in particular to methods of fabrication of highly pixelated detectors, and to detectors fabricated with highly pixelated geometries and their use.

Semiconductor detectors are used in a variety of applications for ionising radiation detection measurements. Ionising radiation interacts with the detector medium (such as Si, Ge, GaAs, CdTe, CZT and a few others) and a number of electron-hole pairs proportional to the deposited energy is produced. Under the influence of the electrical field created inside the detector, the electrons and holes drift apart towards collecting electrodes where they induce a signal with amplitude defined by the initial number of the electrons and holes, hence allowing to measure the energy which was deposited in the interaction between the radiation and the detector medium.

The electrons and holes are produced within a very small volume and they drift along the electrical field lines as charge clouds, which expand due to Coulomb repulsion, Einstein diffusion and interaction with certain detector material defects.

The relation between the signals induced in the detector electrodes and the initial number of electron-hole pairs is a function of many variables, such as detector material, detector geometry, the strength of the electrical field in the detectors and others. There are design rules for choosing the optimal detector geometry for a specific measurement or application. In the case of high resistivity materials such as CdTe, CZT or GaAS there is a benefit to have at least one of the collecting electrodes segmented into small elements, e.g. pixels or strips.

For majority of applications utilising these kind of detector materials, the best results are achieved with detector configurations where the characteristic electrode element size is a few times smaller than the detector thickness. Using one of the extreme configurations with very big or very small pixels produces very specific type of detector response.

The invention relates to the designing of the semiconductor detector geometry to generate particular detector responses in use and thereby to deliver particular device properties.

In accordance with the invention in a first aspect, a method of fabricating a semiconductor detector device to exhibit a target sensitivity to incident radiation in a predetermined energy range comprises:

providing a semiconductor detector;

defining on a detector surface of the semiconductor detector a large plurality of pixels;

wherein the geometry of the detector is controlled with reference to the size of the said pixels such that a single interaction event in the predetermined energy range will produce a detectable signal in each of a plurality of adjacent pixels making up a cluster of at least three pixels.

Each pixel may typically be defined in familiar manner as a region on the detector surface of a semiconductor detector which is separately and discretely addressable by suitable detector electronics such that a detectable signal generated by an interaction event may be measured.

Thus more completely the invention may comprise a method of fabricating a semiconductor detector device to exhibit a target sensitivity to incident radiation in a predetermined energy range comprises:

providing a semiconductor detector;

providing a signal detection system to detect the response of the detector to interaction events with incident radiation;

defining on a detector surface of the semiconductor detector a large plurality of pixels each of which is separately addressable by the detection system to detect a detectable signal generated at the pixel by an interaction event, arranging the detection system further to process together detectable signals generated by adjacent pixels from a single interaction event, wherein the detector's geometry is controlled with reference to the size of the said pixels such that a single interaction event in the predetermined energy range will produce a detectable signal in each of a plurality of adjacent pixels making up a cluster of at least three pixels.

A cluster may be constituted for any given interaction event as a group of pixels adjacent to each other, each of which is separately and discretely addressable by suitable detector electronics such that a detection signal generated by an interaction event may be measured from each, but which are then processed together in a collective manner whereby a single interaction produces a detectable signal through interaction with a plurality of pixels making up the cluster and the resultant signals from each pixel making up the cluster may be processed together to generate additional information about the interaction event.

The invention relates to designing the detector geometry to generate charge cloud profiles across multiple pixels from a single detection event resulting from a single interaction at the detector, and methods to exploit this data to improve the information content collected.

In comparison with conventional pixelated detectors the pixel size is relatively very small given the incident radiation energy. A single interaction event with a single incident quantum of radiation is thereby spread over a number of pixels making up a cluster. For many detection applications this feature may on occasion be seen as undesirable. It may more usually be desirable to avoid such an effect.

However, in respect of the detector design principles embodied by the invention it is used to give a novel functionality. Energy may be correlated to cluster size. Spectral information may be obtained simply by measuring cluster sizes for each of a plurality of interactions without any need to bin incoming radiation into plural spectrally resolved energy bins. Signal processing electronics and principles may be simplified significantly.

In a second aspect of the invention, there is therefore provided a method of obtaining spectral information about incident radiation at a detector, the method comprising:

providing a semiconductor detector;

defining on a detector surface of the semiconductor detector a large plurality of pixels;

wherein the detector is geometry is controlled with reference to the size of the said pixels such that a single interaction event in the predetermined energy range will produce a detectable signal in each of a plurality of adjacent pixels making up a cluster of at least three pixels;

causing radiation to be incident upon the detector:

for each interaction event caused by incident radiation at the detector: detecting the interaction event as a detectable signal in each of a plurality of adjacent pixels making up a cluster;

determining a cluster size;

from successively measured cluster sizes for successive interaction events, inferring spectral information regarding the incident radiation.

Again, more completely, the invention in this aspect may comprise:

providing a semiconductor detector;

providing a signal detection system to detect the response of the detector to interaction events with incident radiation;

defining on a detector surface of the semiconductor detector a large plurality of pixels each of which is separately addressable by the detection system to detect a detectable signal generated at the pixel by an interaction event, arranging the detection system further to process together detectable signals generated by adjacent pixels from a single interaction event, wherein the detector's geometry is controlled with reference to the size of the said pixels such that a single interaction event in the predetermined energy range will produce a detectable signal in each of a plurality of adjacent pixels making up a cluster of at least three pixels;

causing radiation to be incident upon the detector;

for each interaction event caused by incident radiation at the detector: detecting the interaction event as a detectable signal in each of a plurality of adjacent pixels making up a cluster;

determining a cluster size;

from successively measured cluster sizes for successive interaction events, inferring spectral information regarding the incident radiation.

In a third aspect of the invention, there is therefore provided a semiconductor detector comprising:

a semiconductor detector surface having defined thereon a large plurality of pixels; wherein the detector is geometry is controlled with reference to the size of the said pixels such that a single interaction event in the predetermined energy range will produce a detectable signal in each of a plurality of adjacent pixels making up a cluster of at least three pixels.

Again, more completely, the invention in this aspect may comprise:

a semiconductor detector having a detection surface;

a signal detection system to detect the response of the detector to interaction events with incident radiation;

wherein the signal detection system defines on the detection surface a large plurality of pixels each of which is separately addressable by the detection system to detect a detectable signal generated at the pixel by an interaction event, and the detection system is further arranged to process together detectable signals generated by adjacent pixels from a single interaction event, wherein the detector is geometry is controlled with reference to the size of the said pixels such that a single interaction event in the predetermined energy range will produce a detectable signal in each of a plurality of adjacent pixels making up a cluster of at least three pixels.

The detector is in particular a detector for ionizing radiation such as x-rays or gamma-rays or subatomic particle radiation, the predetermined energy range comprising an expected energy for a target ionizing radiation. A single interaction event constitutes the interaction of a plurality of adjacent pixels in the detector with an incident quantum of radiation, for example being an x-ray or gamma photon or subatomic particle. In a particularly applicable case, the detector is a high energy electromagnetic radiation detector and for example a gamma detector, the predetermined energy range comprising an expected energy range for such high energy electromagnetic radiation, and for example for photons with an energy of from a few keV to a few thousand keV and for example from a few tens to a few hundreds of keV.

For each interaction event the incident radiation reacts with the detector material and a number of electron-hole pairs proportional to the deposited energy is produced across an interaction volume in familiar manner. The invention is characterised in that a pixel size is defined with reference to the target predetermined energy range of incident radiation and other controlling parameters to be such that a single interaction event in the predetermined energy range will produce a detectable signal in each of a plurality of adjacent pixels making up a cluster of several pixels. The additional utility provided by such a device then follows from the realisation that the size of the cluster may itself be dependent upon, and hence used to deride information about, the energy of the incident radiation In accordance with the invention a pixel size is defined with reference to the target incident radiation energy range and other controlling parameters to be such that a single interaction event in the predetermined energy range will produce a detectable signal in each of a plurality of adjacent pixels making up a cluster of at least three pixels.

More preferably, a pixel size is defined with reference to the target incident radiation energy range and other controlling parameters to be such that a single interaction event in the predetermined energy range will produce a detectable signal in each of a plurality of adjacent pixels making up a cluster of at least four pixels.

Optimised cluster sizes may vary by application and by desired device properties. In a possible example, a pixel size may be defined with reference to the target incident radiation energy range and other controlling parameters to be such that a single interaction event in the predetermined energy range will produce a detectable signal in each of a plurality of adjacent pixels making up a cluster of between nine and fifteen pixels. This is merely one example of a possible embodiment however.

The optimized pixel size will be material-specific and determined in the first instance with reference to the target incident radiation energy. Other operational controlling parameters and factors may influence cluster size, including without limitation detector thickness and the design operating detector bias voltage. The skilled person will be familiar with the effect of these parameters and will find it within their competence to adjust the design parameters to define a pixel size that produces the desired cluster effect whereby across the target incident radiation energy range an interaction can be expected to produce a detectable signal in each of a plurality of adjacent pixels making up a cluster of pixels as above described. The skilled person will thus be able without undue effort to determine a material-specific optimized pixel size for any suitable detector material and target energy range so as to produce a detector embodying the principles of the invention in that across the target incident radiation energy range an interaction can be expected to produce a detectable signal in each of a plurality of adjacent pixels making up a cluster of pixels as above described.

The detector is a semiconductor detector. The semiconductor preferably a wide band gap semiconductor.

In a preferred embodiment the semiconductor material may be selected from Group II-VI semiconductors and in particular may be selected from cadmium telluride, cadmium zinc telluride (CZT), cadmium manganese telluride (CMT), and alloys thereof, and for example, save for incidental impurities, consists essentially of crystalline $Cd_{1-(a+b)}Mn_aZn_bTe$ where a+b<1 and a and/or b may be zero. A composite device may also have other detector elements of other materials for additional functionality. Cadmium zinc telluride (CZT) may be particularly preferred.

As noted, the optimized pixel size will be material-specific and determined in the first instance with reference to the target incident radiation energy.

In the example case of a cadmium zinc telluride (CZT) detector, suitable parameters might be, with a target energy of incoming photons of for example about 50 keV to about 2000 keV:

thickness of a few mm, for example 2 mm to 10 mm;
pixel size of a few tens to a few hundreds of μm, and for example 50 μm to 500 μm.

Figure 3A:
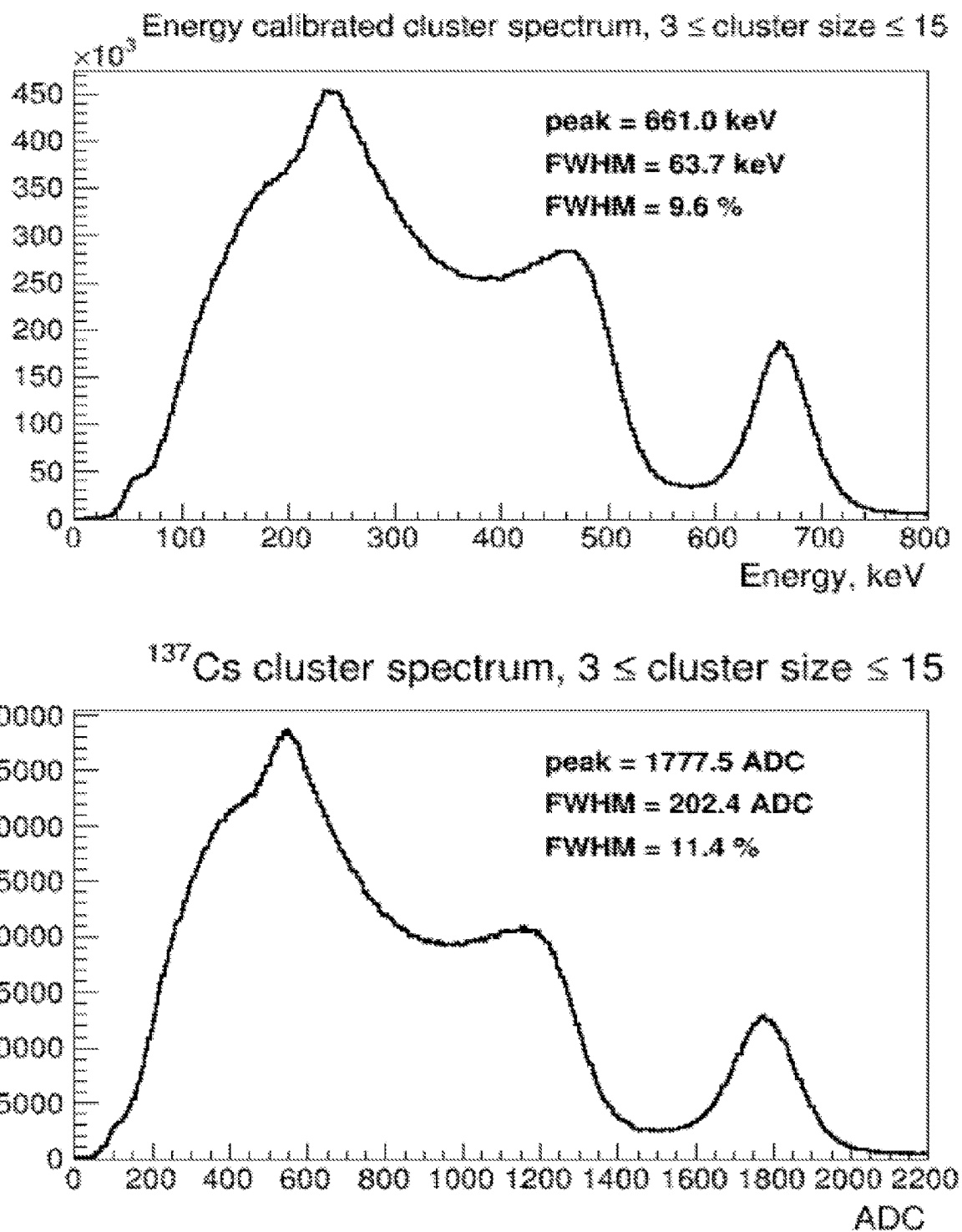
Figure 3B:
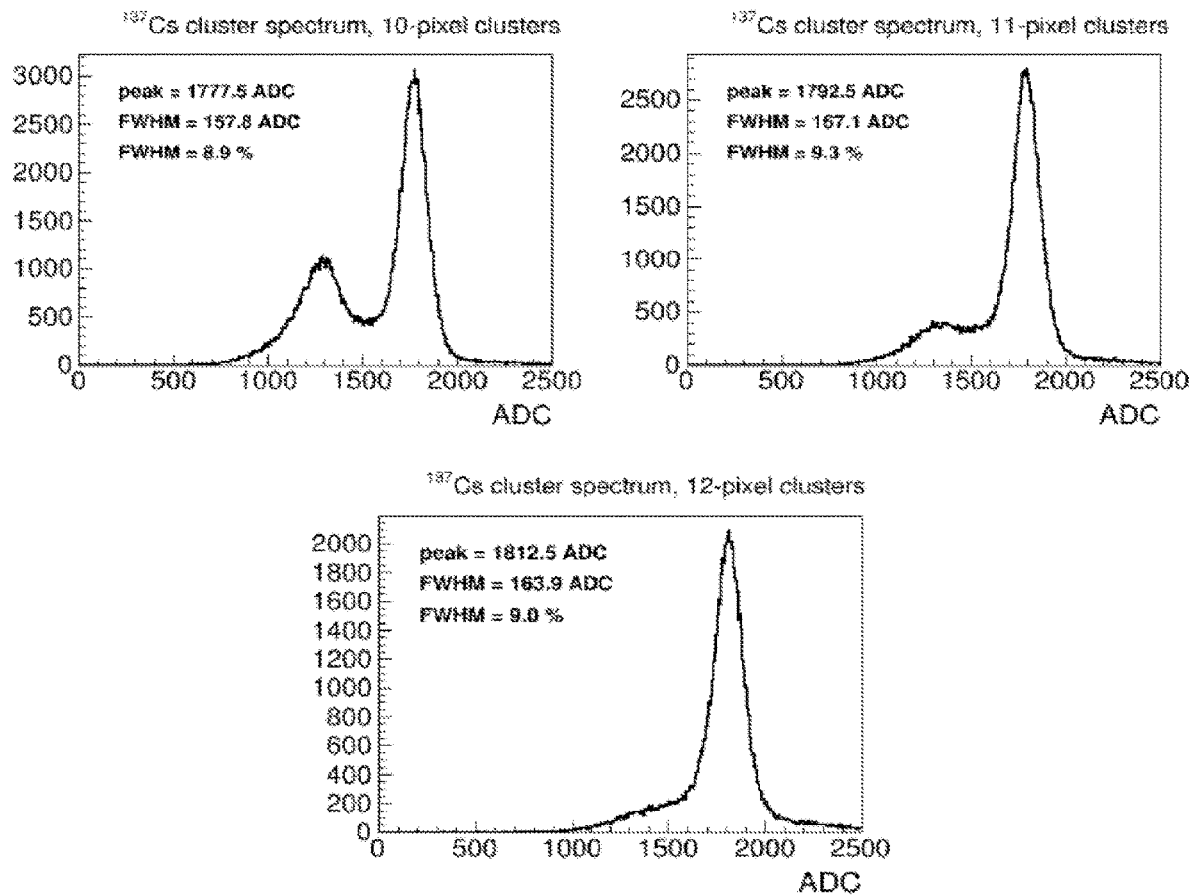

The invention will now be described by way of example only with reference to FIGS. 1 to 3 of the accompanying drawings in which for an example detector embodying the principles of the invention:

FIG. 1 shows an example of the $^{241}$Am spectra (59.5 keV) plotted according to the cluster size;

FIG. 2A, FIG. 2B, FIG. 2C, and FIG. 2D show the same for $^{137}$Cs spectra (662 keV);

FIG. 3A and FIG. 3B show spectral data after further data processing.

In a particular embodiment with a CZT detector configuration with pixel size which is much smaller than the detector thickness, the characteristic size of the charge cloud by the time when it reaches the collecting electrode is also significantly larger than the individual pixels. Such a configuration produces a specific detector response which allows to apply novel approaches to utilising the detectors in dedicated applications.

For example, for a 5 mm thick CZT detector with 110 μm pixels, the incoming photons with the energies of ~100 keV will induce signals in the pixelated anode in the form of clusters comprised of several pixel. The characteristic number of pixels per cluster grows rapidly as a function of the incoming photon energy: starting with 2-4 pixels at 60 keV, 3-5 pixels at 122 keV and reaching 9-15 pixels at 662 keV.

The resulting energy spectra plotted using clusters of specific sizes will vary strongly depending on the cluster size thus providing a new tool for optimising detector configuration for a specific application or a combination of a few.

FIG. 1 shows an example of the $^{241}$Am spectra (59.5 keV) plotted according to the cluster size for some example cluster sizes, with the bottom right plot showing all cluster sizes. FIG. 2A, FIG. 2B, FIG. 2C, and FIG. 2D show the same for $^{137}$Cs spectra (662 keV) plotted according to another example range of cluster sizes.

As one can see from the $^{137}$Cs spectra, it's possible for example to choose a subsample of data which will have the photoelectric interaction peak (662 keV) enhanced in relation to the Compton continuum part of the spectrum.

There is a range of opportunities to utilise the invention. For example, four different embodiments which make use of the enhanced photoelectric peak are:

1. The energy resolution of each spectrum corresponding to the specific cluster size is better than their sum. One can implement a weighted sum procedure to further improve the energy resolution of the summed spectrum. An example of such treatment is shown in FIG. 3A and FIG. 3B The figure shows: top left—energy calibrated $^{137}$Cs spectrum obtained with calibrating each cluster size spectrum separately. Top right—summed spectrum obtained without energy calibration, with summation in the same range of cluster sizes. One can see that the energy calibrated spectrum has better energy resolution (Full Width Half Maximum). Bottom—a few examples of the spectra corresponding to the specific cluster sizes. One can see that the energy resolution of some spectra can be better than that of the summed spectrum. In addition to that, some spectra contain almost no contributions from the Compton scattered events, they have one main peak corresponding to the photoelectric events.

2. In an imaging application with photon energies high enough to have significant amount of Compton scattering in the detector medium, the primary interactions of the incoming radiation contribute to the true image of the source (i.e. the image obtained with the photons which didn't have any interactions between the point of their emission and point of their absorption in the detector), while the secondary interactions introduce physics background noise into the image. Using a weighted combination of the spectra by the cluster size, one can minimise and even exclude the contribution from the secondary interactions, hence improving the image quality and contrast. In addition, each one of the specific cluster size spectra can be processed separately to improve certain features which are most prominent in them. For example, one can apply the principal component analysis to each spectrum and to apply a filter on the principal components of the image before constructing the combined image. This will allow emphasizing specific features of total spectrum and optimising the image for a specific application.

3. Thick CZT detectors (a few mm and more) are known to exhibit a depth dependence of the measured signal, i.e. a photon of the same energy will produce a different signal in the pixelated anode depending on where along the detector thickness it was absorbed. The effect could be corrected for, if one was able to measure the interaction position inside the detector bulk. In the case of a very small pixel size, this will also mean producing clusters of different sizes. Using cluster size selection criteria, one can incorporate a depth dependence correction into the image analysis without measuring the interaction position inside the detector.

4. Any of the techniques described above could be combined while analysing one set of data, thus allowing to obtain optimal results for different applications but with a single measurement. For example, the whole date set could be used for delivering an overall gamma ray image of the scanned area and for choosing one or more regions of interest (ROI). Smaller processed sub-sets of data could be used to enhance certain features and to perform spectroscopy in these ROI.

The invention claimed is:

1. A method of fabricating a semiconductor detector device to exhibit a target sensitivity to incident radiation in a predetermined energy range comprising:

providing a semiconductor detector;
defining on a detector surface of the semiconductor detector a large plurality of pixels;
wherein the detector geometry is controlled with reference to the size of the said pixels such that a single interaction event in the predetermined energy range will produce a detectable signal in each of a plurality of adjacent pixels making up a cluster of at least three pixels each of the clusters having a cluster size and using the cluster size as a substitute for a property of the single interaction event for each interaction event; and determining a correction for the property of the single interaction event for the single interaction event based upon the cluster size.

2. A method in accordance with claim 1 wherein each pixel is defined as a region on the detector surface of a semiconductor detector which is separately and discretely addressable by suitable detector electronics such that a detectable signal generated by an interaction event may be measured.

3. A method in accordance with claim 1 comprising:
providing a signal detection system to detect the response of the detector to interaction events with incident radiation;
defining on a detector surface of the semiconductor detector a large plurality of pixels each of which is separately addressable by the detection system to detect a detectable signal generated at the pixel by an interaction event,
arranging the detection system further to process together detectable signals generated by adjacent pixels from a single interaction event,
wherein the detector geometry is controlled with reference to the size of the said pixels such that a single interaction event in the predetermined energy range will produce a detectable signal in each of a plurality of adjacent pixels making up a cluster of at least three pixels.

4. A method in accordance with claim 1 wherein the detector is a detector for ionizing radiation selected from: x-rays or gamma-rays or subatomic particle radiation.

5. A method in accordance with claim 4 wherein the detector is a detector for high energy electromagnetic radiation.

6. A method or detector in accordance with claim 5 wherein the predetermined energy range is for photons with an energy of from a few keV to a few thousand keV.

7. A method in accordance with claim 1 wherein the detector geometry is controlled with reference to the size of the said pixels such that a single interaction event in the predetermined energy range will produce a detectable signal in each of a plurality of adjacent pixels making up a cluster of at least four pixels.

8. A method in accordance with claim 7 wherein the detector geometry is controlled with reference to the size of the said pixels such that a single interaction event in the predetermined energy range will produce a detectable signal in each of a plurality of adjacent pixels making up a cluster of between nine and fifteen pixels.

9. A method in accordance with claim 1 wherein the detector is a wide band gap semiconductor.

10. A method in accordance with 1 wherein the detector is a semiconductor selected from cadmium telluride, cadmium zinc telluride (CZT), cadmium manganese telluride (CMT), and alloys thereof.

11. A method in accordance with claim 10 wherein the detector is a cadmium zinc telluride (CZT) detector.

12. A method in accordance with claim 11 wherein the detector has a predetermined energy range of incoming photons of 50 keV to 1000 keV; a thickness of 2 mm to 10 mm; and a pixel size of 50 µm to 200 µm.

13. A method of obtaining spectral information about incident radiation at a detector, the method comprising:
providing a semiconductor detector;
defining on a detector surface of the semiconductor detector a large plurality of pixels;
wherein the detector geometry is controlled with reference to the size of the said pixels such that a single interaction event in the predetermined energy range will produce a detectable signal in each of a plurality of adjacent pixels making up a cluster of at least three pixels each of the clusters having a cluster size and using the cluster size as a substitute for a property of the single interaction event for each interaction event; and
determining a correction for the property of the interaction event for the single interaction event based upon the cluster size;
causing radiation to be incident upon the detector;
for each interaction event caused by incident radiation at the detector:
detecting the interaction event as a detectable signal in each of a plurality of adjacent pixels making up a cluster;
determining a cluster size;
from successively measured cluster sizes for successive interaction events, inferring spectral information regarding the incident radiation.

14. A method in accordance with claim 13 comprising:
providing a signal detection system to detect the response of the detector to interaction events with incident radiation;
defining on a detector surface of the semiconductor detector a large plurality of pixels each of which is separately addressable by the detection system to detect a detectable signal generated at the pixel by an interaction event,
arranging the detection system further to process together detectable signals generated by adjacent pixels from a single interaction event,
wherein the detector geometry is controlled with reference to the size of the said pixels such that a single interaction event in the predetermined energy range will produce a detectable signal in each of a plurality of adjacent pixels making up a cluster of at least three pixels;
causing radiation to be incident upon the detector;
for each interaction event caused by incident radiation at the detector:
detecting the interaction event as a detectable signal in each of a plurality of adjacent pixels making up a cluster;
determining the cluster size;
from successively measured cluster sizes for successive interaction events, inferring spectral information regarding the incident radiation.

15. A semiconductor detector comprising:
a semiconductor detector surface having defined thereon a large plurality of pixels;
wherein the detector geometry is controlled with reference to the size of the said pixels such that a single interaction event in the predetermined energy range will produce a detectable signal in each of a plurality of adjacent pixels making up a cluster of at least three pixels each of the clusters having a cluster size and using the cluster size as a substitute for a property of the single interaction event for each interaction event; and
determining a correction for the property of the interaction event for the single interaction event based upon the cluster size.

16. A semiconductor detector according to claim 15 further comprising a signal detection system to detect the response of the detector to interaction events with incident radiation;

wherein the signal detection system defines on the detection surface a large plurality of pixels each of which is separately addressable by the detection system to detect a detectable signal generated at the pixel by an interaction event, and the detection system is further arranged to process together detectable signals generated by adjacent pixels from a single interaction event, wherein the detector geometry is controlled with reference to the size of the said pixels such that a single interaction event in the predetermined energy range will produce a detectable signal in each of a plurality of adjacent pixels making up a cluster of at least three pixels.

17. A detector in accordance with claim 15 wherein the detector is a detector for ionizing radiation selected from: x-rays or gamma-rays or subatomic particle radiation.

18. A detector in accordance with claim 15 wherein the detector geometry is controlled with reference to the size of the said pixels such that a single interaction event in the predetermined energy range will produce a detectable signal in each of a plurality of adjacent pixels making up a cluster of at least four pixels.

19. A detector in accordance with claim 15 wherein the detector is a wide band gap semiconductor.

20. A detector in accordance with claim 15 wherein the detector is a semiconductor selected from cadmium telluride, cadmium zinc telluride (CZT), cadmium manganese telluride (CMT), and alloys thereof.

* * * * *